United States Patent
Lakafosis et al.

(10) Patent No.: US 10,447,539 B2
(45) Date of Patent: Oct. 15, 2019

(54) SYSTEM FOR PROVISIONING RACKS AUTONOMOUSLY IN DATA CENTERS

(71) Applicant: Uber Technologies, Inc., San Francisco, CA (US)

(72) Inventors: Vasileios Lakafosis, San Francisco, CA (US); Robin Bassant, Sunnyvale, CA (US); Harshmeet Singh, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 109 days.

(21) Appl. No.: 15/851,588

(22) Filed: Dec. 21, 2017

(65) Prior Publication Data

US 2019/0199591 A1    Jun. 27, 2019

(51) Int. Cl.
| | |
|---|---|
| G06F 15/177 | (2006.01) |
| H04L 12/24 | (2006.01) |
| H04L 12/26 | (2006.01) |
| G06F 9/54 | (2006.01) |
| H04L 29/08 | (2006.01) |

(52) U.S. Cl.
CPC .......... *H04L 41/0886* (2013.01); *G06F 9/547* (2013.01); *H04L 41/0813* (2013.01); *H04L 41/0853* (2013.01); *H04L 41/0869* (2013.01); *H04L 41/0893* (2013.01); *H04L 41/12* (2013.01); *H04L 43/0817* (2013.01); *H04L 69/329* (2013.01)

(58) Field of Classification Search
CPC . H04L 41/0886; H04L 41/0893; H04L 41/12; H04L 41/0813; H04L 41/0869; G06F 9/547

USPC .......................................................... 709/220
See application file for complete search history.

(56) References Cited

U.S. PATENT DOCUMENTS

| | | |
|---|---|---|
| 5,751,967 A | 5/1998 | Raab et al. |
| 6,269,099 B1 | 7/2001 | Borella et al. |
| 7,774,822 B2 | 8/2010 | Buckley et al. |
| 8,040,869 B2 | 10/2011 | Gaspard et al. |
| RE43,704 E | 10/2012 | Gupta et al. |
| 8,339,994 B2 | 12/2012 | Gnanasekaran et al. |
| 8,352,632 B2 | 1/2013 | Voigt et al. |

(Continued)

FOREIGN PATENT DOCUMENTS

WO    WO 2016/053665 A1    4/2016

OTHER PUBLICATIONS

PCT International Search Report and Written Opinion, PCT Application No. PCT/IB2018/059074, dated Feb. 27, 2019, 14 pages.

*Primary Examiner* — Krisna Lim
(74) *Attorney, Agent, or Firm* — Fenwick & West LLP

(57) ABSTRACT

A provisioning system autonomously and asynchronously brings up data center racks. In an embodiment, the provisioning system determines presence of a first and second device connected to a network. The provisioning system generates a first and second thread for validation of the first and second devices, respectively. Responsive to determining by the first thread that the first device is not validated, the provisioning system notifies a detection system that the validation of the first device has not passed. Responsive to determining by the second thread that the second device is validated, the provisioning system provisions the second device for integration with one or more provisioned devices on the network.

20 Claims, 7 Drawing Sheets

(56) References Cited

U.S. PATENT DOCUMENTS

| | | | |
|---|---|---|---|
| 8,392,575 B1* | 3/2013 | Marr | G06F 9/5061 |
| | | | 370/252 |
| 8,416,796 B2 | 4/2013 | Forster et al. | |
| 8,787,170 B2 | 7/2014 | Ong et al. | |
| 8,867,512 B2 | 10/2014 | Li et al. | |
| 9,172,608 B2 | 10/2015 | Zeyliger et al. | |
| 9,455,872 B2 | 9/2016 | Lingen | |
| 2012/0311127 A1* | 12/2012 | Kandula | H04W 16/28 |
| | | | 709/224 |
| 2013/0198346 A1 | 8/2013 | Jubran et al. | |
| 2014/0277784 A1 | 9/2014 | Mick et al. | |
| 2015/0074246 A1 | 3/2015 | Premji et al. | |
| 2015/0138993 A1 | 5/2015 | Forster et al. | |
| 2015/0304164 A1 | 10/2015 | Goetje | |
| 2016/0127254 A1 | 5/2016 | Kumar et al. | |
| 2017/0064047 A1 | 3/2017 | Bosshart | |
| 2018/0145955 A1* | 5/2018 | Nirwal | H04L 9/0894 |
| 2018/0241737 A1* | 8/2018 | Chang | H04L 63/0807 |

* cited by examiner

```
common.utils: INFO    BGP Unconverged
common.utils: ERROR   Non-Existent Interface '27/1'
```

| A Device | A Interface | Z Device | Z Interface | BGP State |
|---|---|---|---|---|
|   | Eth27/1 | N/A | N/A | Non-Established |
| X | Eth28/1 | A | Ethernet11/1 | Established |
| X | Eth29/1 | B | Ethernet11/1 | Established |
| X | Eth30/1 | C | Ethernet11/1 | Established |
| X | Eth31/1 | D | Ethernet11/1 | Established |
| X | Eth32/1 | E | Ethernet11/1 | Established |

SYSTEM FOR PROVISIONING RACKS AUTONOMOUSLY IN DATA CENTERS

BACKGROUND

Field

This disclosure generally relates to bringing up data center devices using autonomous detection and validation of devices.

Description of the Related Art

Existing systems for provisioning devices in a data center require a user to configure the devices manually. The user—for example, a data center administrator—inputs commands via a user interface of a client device such as a serial console to retrieve information from a device for provisioning. Based on the retrieved information, the user selects a configuration to bring the device to a production-ready state. However, this process is time consuming due to its synchronous nature of steps. In particular, the user has to wait to receive an indication that a current step in the process has successfully completed before progressing to a subsequent step. Moreover, the devices may encounter problems during onboarding, such as faulty hardware or incorrect images, and debugging problems on a device-by-device basis requires tedious intervention.

SUMMARY

A provisioning system autonomously and asynchronously brings up data center racks including devices such as servers, switches, consoles, storage, etc. Using neighbor discovery protocol, provisioned devices can determine the role and/or identity of other devices on a network. Responsive to determining that a device on the network is reachable, the provisioning system may request additional information from the device. The provisioning system may perform one or more validations to determine if a device configuration is valid and ready for production. The provisioning system provisions devices that are successfully validated, e.g., by deploying the device configuration. For devices that do not pass validation, the provisioning system may generate a ticket to alert a user or may trigger an auto-remediation framework. In some embodiments, given certain conditions and issue identified, the provisioning system uses an "auto-remediation framework" with prescribed solutions to mitigate that issue. The provisioning system may use multiple threads to validate different instances of devices asynchronously and/or simultaneously.

BRIEF DESCRIPTION OF DRAWINGS

FIG. 4 is a diagram illustrating an example user interface of a provisioning system according to an embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1A:
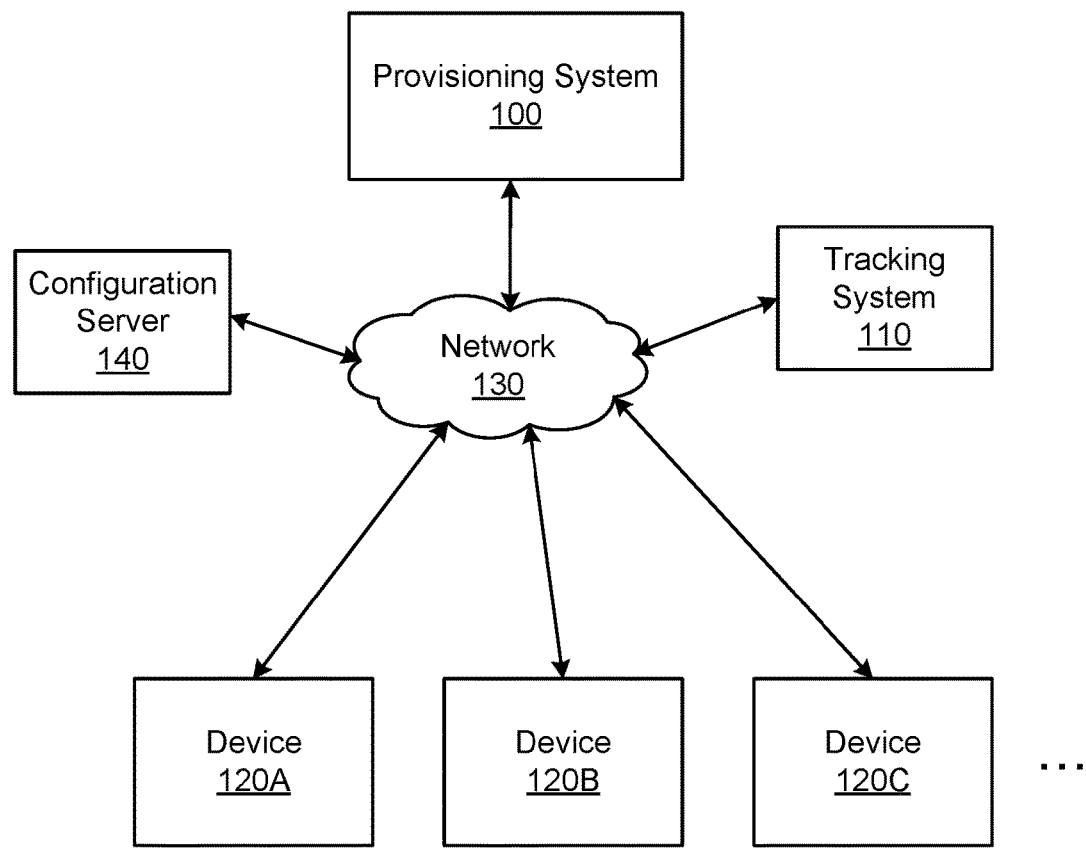
FIG. 1A is a diagram of a system environment for a provisioning system according to an embodiment.

FIG. 1A is a diagram of a system environment for a provisioning system 100 according to one embodiment. The provisioning system 100 may autonomously and asynchronously bring up devices connected to each other via a network, e.g., for a data center. Using a neighbor discovery protocol, provisioned devices in the network may determine a role or identity of other devices on the network. Responsive to establishing communication and performing an initial validation with the other devices, the provisioning system 100 may request additional information from these devices. The provisioning system 100 may perform another validation using the additional information to determine if the configuration of the devices are valid.

The system environment includes the provisioning system 100, a tracking system 110, a configuration server 140, and devices 120, for example, devices 120A, 120B, and 120C (which may collectively be referred to herein as a "device 120" or "devices 120"). In other embodiments, different or additional entities can be included in the system environment. For instance, though three devices 120 are shown in the embodiment of FIG. 1A, in practice, the system environment may include any number of devices 120, which may or may not already be provisioned. The functions performed by the various entities of FIG. 1A may vary in different embodiments.

The provisioning system 100, tracking system 110, configuration server 140, and devices 120 may be connected to each other via the network 130, which may comprise any combination of local area and wide area networks employing wired or wireless communication links. In one embodiment, the network 130 uses standard communications technologies and Internet protocols. For example, the network 130 includes communication links using technologies such as the Internet, 3G, 4G, BLUETOOTH®, or Wi-Fi. In some embodiments, all or some of the communication links of the network 130 may be encrypted.

The devices 120 may include, for example, servers, consoles, storage, routers, pod switches, rack switches, out-of-band switches, power sources, processors, user input devices, sensors, telecommunication devices, among other types of devices or network components. Devices 120A, 120B, and 120C may be the same or different types of devices. In some embodiments, a data center includes at least some of the devices 120 organized into racks or another type of structure. A device 120 may be associated with a device type or role, device version (e.g., of hardware or firmware), identity/identifier (e.g., serial number, MAC address, model, or manufacturer name), or other metadata. A device 120 may be assigned a network address, e.g., an Internet protocol (IP) address. In some embodiments, devices 120 receive IP addresses from the configuration server 140, which is a Dynamic Host Configuration Protocol (DHCP) server that provides network configuration parameters. In other embodiments, a device 120 may receive its IP address from another system.

The tracking system 110 includes one or more computing devices capable of processing data as well as transmitting and receiving data via the network 130. For example, the tracking system 110 may be a desktop computer, a laptop computer, a mobile phone, a tablet computing device, an Internet of Things (IoT) device, or any other device having computing and data communication capabilities. In some embodiments, the tracking system 110 receives information from the provisioning system 100 describing status of devices 120. The tracking system 110 may present the information (e.g., the user interface shown in FIG. 4 and further described below) on an electronic display to a user. For example, the tracking system 110 displays information about a rack of devices 120 that has been successfully brought up to production, or a ticket indicating a problem identified during validation or provisioning of a device 120.

Figure 1B:
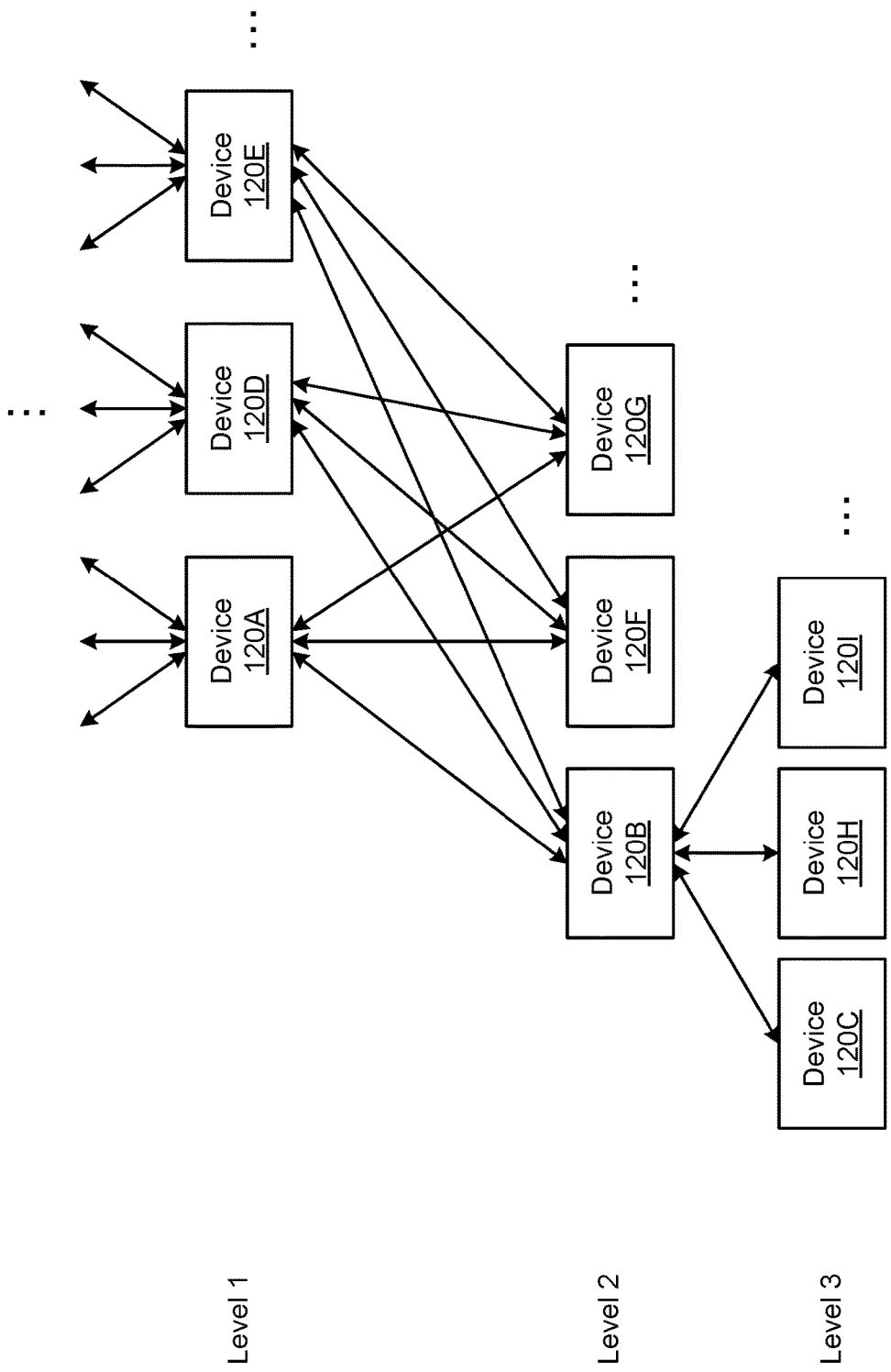
FIG. 1B is a diagram of example devices of a data center according to an embodiment.

FIG. 1B is a diagram of example devices of a data center according to an embodiment. A data center may include devices 120 organized in a hierarchy of different levels. In the embodiment shown in FIG. 1B, a hierarchy includes at least three levels of devices 120. Devices 120 in a given level may be communicatively coupled (e.g., in wired or wireless connection via the network 130 or directly) to other devices 120 on a different level or the same level. For instance, the device 120B on level 2 may communicate with at least devices 120A, 120D, and 120E on level 1 and devices 120C, 120H, and 120I on level 3. By using connections on the network 130, devices 120 may discover neighbor devices 120 on the same or different levels. Levels may correspond to different types of devices. As an example, level 1 includes pod switch devices 120, level 2 includes rack switch devices 120, and level 3 includes servers and switches. In other embodiments, levels may include a set of heterogeneous types of devices 120. Though only three levels each including three devices 120 are illustrated in FIG. 1B, in practice, the provisioning system 100 may be used to provision data centers including any number of levels (including no levels) each including any number of devices 120.

Example Provisioning System

Figure 2:
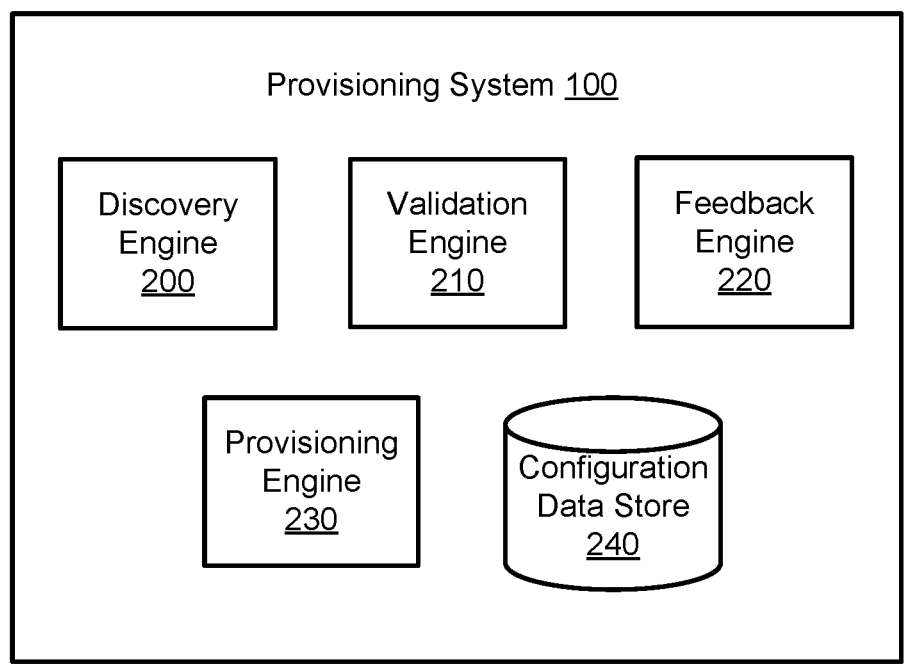
FIG. 2 is block diagram of a provisioning system according to an embodiment.

FIG. 2 is block diagram of a provisioning system 100 according to an embodiment. The provisioning system 100 includes a discovery engine 200, validation engine 210, feedback engine 220, provisioning engine 230, and configuration data store 240. In other embodiments, the provisioning system 100 may include additional, fewer, or different components for various applications.

The discovery engine 200 determines the presence of devices 120 on the network 130. The discovery engine 200 may discover provisioned devices 120 and/or devices that are not provisioned. In some embodiments, the discovery engine 200 uses the DHCP protocol in conjunction with the configuration server 140 to determine the presence of devices 120. For instance, the discovery engine 200 may receive an IP address of a device 120 assigned by the configuration server 140.

The validation engine 210 performs automatic validation (or "auto-validation") of devices 120 identified by the provisioning system 100. In some embodiments, the validation engine 210 performs auto-validation in multiple stages, for example, initial auto-validation (or "minimum auto-validation") and full auto-validation. The initial auto-validation may be a lighter validation process completed before progressing to a more involved full auto-validation process. For instance, during initial auto-validation, the validation engine 210 verifies that a device 120 has a valid identification, e.g., IP address, and can communicate with the validation engine 210. Responsive to determining that a device 120 does not pass a stage of validation, the validation engine 210 may automatically re-attempt the validation after a certain duration of time and/or until a certain timeout duration, e.g., trying to revalidate every 2 minutes up to 40 minutes.

The full auto-validation of a given device 120 may include determining that a given device 120 is connected to valid neighbor devices (e.g., that are properly configured/imaged or provisioned for production use) on the network 130. During full auto-validation, the validation engine 210 may correct one or more ports of the given device 120 connected to one of the neighbor devices. In some embodiments, the validation engine 210 determines whether there is convergence of the given device 120 on the network 130 using Border Gateway Protocol (BGP), e.g., a BGP state is established. For instance, the given device 120 determines communication paths (e.g., of a routing table) to communicate with other devices 120 on the network 130. In addition, the validation engine 210 may determine that one or more power supply values of the given device 120 is within a threshold value, which may be based on a target operating range of a device (e.g., 0 volts to 5 volts or 12 volts). The provisioning system 100 is extensible to allow various types of validation based on the data provided by the device 120 itself, for instance, through one or more types of "show" commands. In embodiments where the devices 120 are organized in a hierarchy, the validation engine 210 may determine a role and/or identity of the given device 120 in the hierarchy. For instance, the role indicates a level of the hierarchy (e.g., as shown in FIG. 1B), and the identity identifies the given device 120 from other devices in the same level. Roles and/or identities may also indicate a type of the given devices 120, for example, a pod switch, rack switch, server, etc.

The feedback engine 220 generates feedback regarding devices managed by the provisioning system 100. In some embodiments, the feedback engine 220 generates notifications during a validation process and provides the notifications to the tracking system 110 or another system. For example, responsive to the validation engine 210 determining that a particular device 120 does not pass an auto-validation process, the feedback engine 220 generates a ticket indicating the status of the validation or particular device 120. The ticket may include information describing an issue regarding why the particular device 120 did not pass validation, and/or describing a recommended resolution for the issue. Example issues include BGP un-converged, unknown or non-existent interface detected, incorrect ports, device not powered on, cable not plugged in, and device version out-of-date, among others. In some embodiments, the provisioning system 100 uses an "auto-remediation" framework to mitigate or resolve issues of devices 120 automatically, e.g., without necessarily requiring manual intervention or input. The provisioning system 100 may select a prescribed solution (e.g., a predetermined set of one or more steps) based on an identified issue and/or condition associated with a generated notification or ticket. For instance, responsive to detecting an interface flap event, e.g., due to a hardware failure of a device 120, the provisioning system 100 uses the "auto-remediation" framework to mitigate this issue by performing a "shut/no shut" on the interface for the device 120. In some embodiments, responsive to the validation engine 210 determining that a particular device 120 passes an auto-validation, the feedback engine 220 notifies the tracking system 110 that the particular device 120 is ready to progress to a subsequent stage of validation, or has completed validation and is production ready.

The provisioning engine 230 performs automatic provisioning (or "auto-provision") of devices 120 validated by the validation engine 210. In some embodiments, the provisioning engine 230 determines an appropriate image and/or configuration for a device 120, e.g., using device information received from the device 120. The image or configuration may vary based on the type of device (e.g., switch, server, etc.) or version (e.g., firmware, hardware, etc.). The provisioning engine 230 images the device 120 using the image and/or configuration. Further, the provisioning engine 230 may store images or configurations in the configuration data store 240.

Figure 3:
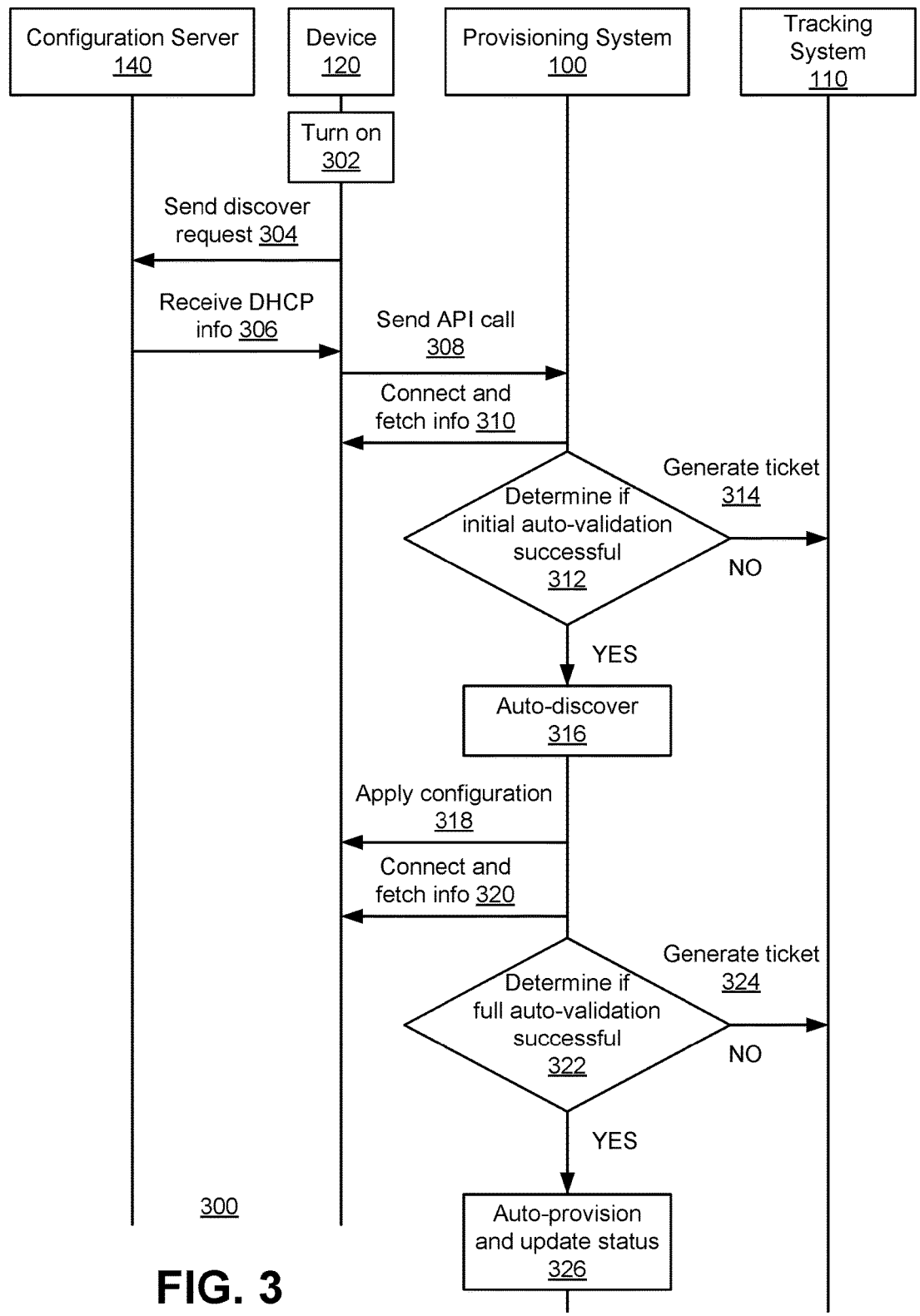
FIG. 3 is a sequence diagram illustrating a process of provisioning a device according to an embodiment.

FIG. 3 is a sequence diagram illustrating a process 300 of provisioning a device 120 according to an embodiment. In some embodiments, the provisioning system 100, tracking system 110, device 120, and configuration server 140 uses the process 300 within the system environment in FIG. 1A. The process 300 may include different or additional steps than those described in conjunction with FIG. 3 in some embodiments or perform steps in different orders than the order described in conjunction with FIG. 3.

The provisioning system 100 receives information from the device 120 through steps 302 through 310 to perform an initial auto-validation. In particular, the device 120 turns on and connects to the network 130 in step 302. In step 304, the device 120 sends a discover request to the configuration server 140. In some embodiments, the configuration server 140 is a DHCP server and the device 120 performs a DHCP discovery request by broadcasting messages on the network 130. In response to receiving the DHCP discover request, the configuration server 140 may reserve an IP address for the device 120 and send a DHCP offer to the device 120, where the offer indicates at least the IP address. Responsive to receiving the DHCP offer, the device 120 sends a DHCP request to the configuration server 140 to request the offered IP address. Responsive to receiving the DHCP request, the configuration server 140 assigns the IP address to the device 120 and sends a DHCP acknowledge message to the device 120 to confirm the assignment.

The device 120 having an IP address may trigger itself automatically to initiate a process for validation by the provisioning system 100. In particular, the device 120 sends an application programming interface (API) call to the provisioning system 100 in step 308. In some embodiments, the call is Representational State Transfer (REST) API call, which provides interoperability between different devices 120 and communication of web resources over the network 130. In step 310, the provisioning system 100 connects to the device 120 and fetches information from the device 120 responsive to receiving the API call. The fetched information may include the IP address of the device 120. In some embodiments, the fetched information includes a minimum configuration required to perform an initial auto-validation (or "minimum auto-validation") process. The minimum configuration includes information to enable communication between the device 120 and the provisioning system 100, e.g., SSH (Secure Shell) and login credentials.

The provisioning system 100 performs initial auto-validation of the device 120 using the fetched information. In step 312, the provisioning system 100 determines if the device 120 passes initial auto-validation. Responsive to determining that the device 120 does not pass in step 314, the provisioning system 100 generates a ticket indicating the status of device 120 and provides the ticket to the tracking system 110. Responsive to determining that the device 120 passes, the provisioning system 100 performs an auto-discover process in step 316 to receive additional information from the device 120 for full auto-validation. In particular, the provisioning system 100 applies a configuration or image to the device 120. Furthermore, the provisioning system 100 may store the configuration and image (applied to the device 120) in the configuration data store 240, e.g., which may be mapped to information describing the device 120 such as its IP address. In step 320, the provisioning system 100 connects to the configured device 120 and fetches the additional information for full auto-validation. In some embodiments, responsive to determining that application of the configuration or image does not complete, the provisioning system 100 may generate and provide a ticket describing the error to the tracking system 110.

The provisioning system 100 performs full auto-validation of the device 120 using the additional information. In step 322, the provisioning system 100 determines if the device 120 passes the full auto-validation. Responsive to determining that the device 120 does not pass in step 324, the provisioning system 100 generates a ticket indicating the status of device 120 and provides the ticket to the tracking system 110. Responsive to determining that the device 120 passes, the provisioning system 100 performs an auto-provision process and updates a status of the device 120 in step 326. The provisioning system 100 may use one or more third party systems to perform provisioning and/or for any other process of the provisioning system 100. In some embodiments, responsive to completion of the auto-provision process, the provisioning system 100 determines that the device 120 is production-ready and updates the status accordingly to reflect the status. Responsive to determining an error during the provisioning process, the provisioning system 100 may update the status to indicate that the device 120 is not ready for production. The provisioning system 100 may store the update in the configuration data store 240.

FIG. 4 is a diagram illustrating an example user interface 400 of a provisioning system 100 according to an embodiment. The tracking system 110 may present the user interface 400 on an electronic display responsive to receiving information from the provisioning system 100. In the embodiment illustrated in FIG. 4, the user interface 400 indicates that a data center rack includes a device 120 that has a non-established BGP state. Moreover, there is an error indicating one of the interfaces is non-existent. Thus, the provisioning system 100 prevents the data center rack from going into production.

Example Process Flow

Figure 5:
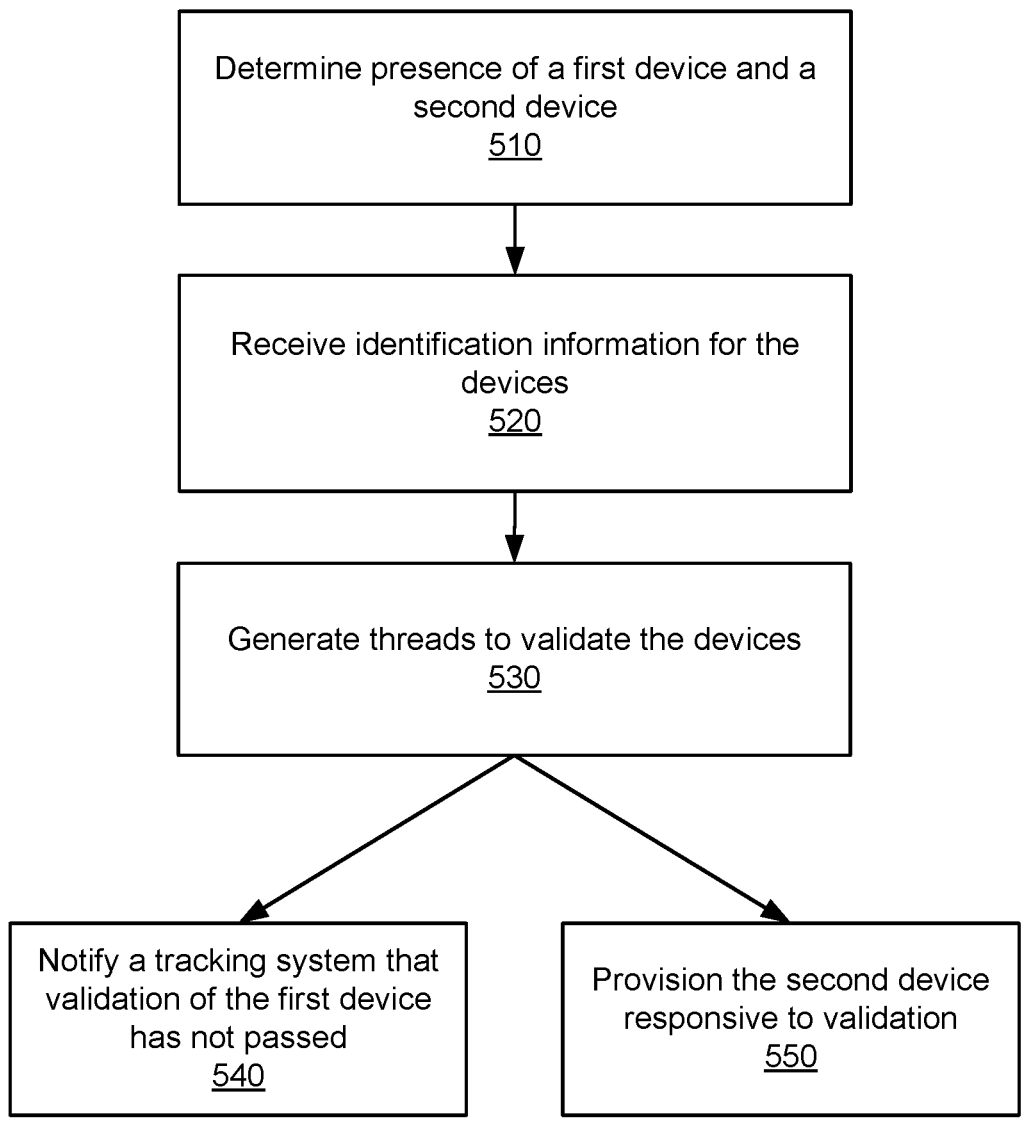
FIG. 5 is a flowchart illustrating a process for detecting and provisioning devices according to one embodiment.

FIG. 5 is a flowchart illustrating a process 500 for detecting and provisioning devices according to one embodiment. In some embodiments, the provisioning system 100 uses the process 500 within the system environment in FIG. 1A. The process 500 may include different or additional steps than those described in conjunction with FIG. 5 in some embodiments or perform steps in different orders than the order described in conjunction with FIG. 5.

The discovery engine 200 of the provisioning system 100 determines 510 (e.g., using one or more processors) presence of a first device, e.g., device 120A shown in FIGS. 1A-B, and a second device, e.g., device 120B shown in FIGS. 1A-B, of devices connected to a network 130. The devices further include one or more provisioned devices 120. The discovery engine 200 receives 520 identification information for the first device 120 and the second device 120. The validation engine 210 generates 530 threads, for example, a first thread and a second thread for validation of the first device 120 and the second device 120 respectively, using at least the identification information. Responsive to determining by the first thread that the first device 120 is not validated, the feedback engine 220 notifies 540 a detection system 110 that the validation of the first device 120 has not passed. The provisioning system 100 may prevent a data center rack from going into production responsive to determining that the data center rack includes at least one device 120 that has an unresolved issue or that has not yet passed a validation.

Responsive to determining by the second thread that the second device 120 is validated, the provisioning engine 230 provisions 550 the second device 120 for integration with the one or more provisioned devices. In some embodiments, responsive to determining that all devices 120 of a data center rack have been validated and that there are no remaining unresolved issues, the provisioning system 100 updates a status of the data center rack to "production ready." The provisioning system 100 may store statuses of devices or data center racks in the configuration data store 240. Furthermore, the feedback engine 220 may notify the detection system 110 that a data center rack has a production ready status. The provisioning system 100 may trigger a workflow for the data center rack responsive to determining that it is production ready.

In some embodiments, the first and second devices 120, along with the provisioned devices 120, are connected to each other in a hierarchy. The first and second devices 120 may correspond to different levels of the hierarchy and may have different roles or identities. For example, the first device 120 is a switch for a pod at a first level, while the second device 120 is a switch for a rack at a second level. In an embodiment, the hierarchy has a third level including servers, and the provisioning system 100 may detect presence of a third device 120 from the third level.

The provisioning system 100 provides advantages over existing methods for provisioning data center devices. In particular, conventional systems require a user to bring up data center racks manually. This tedious process may involve organizing information from multiple device vendors in a spreadsheet, creating tickets for debugging, and inputting commands via serial console in a synchronous manner (e.g., having to wait for a step to complete before progressing to a subsequent step). Bringing up a data center rack using conventional systems can take up to five or more hours. In contrast, the autonomous and asynchronous features of the provisioning system 100 can bring up a data center within 7-40 minutes, in some example use cases. In data centers with large volumes of devices, the resources and time saved is particularly beneficial, e.g., to maintain reliable and scalable services that utilize computational resources of data centers.

Example Physical Components of a Computer

Figure 6:
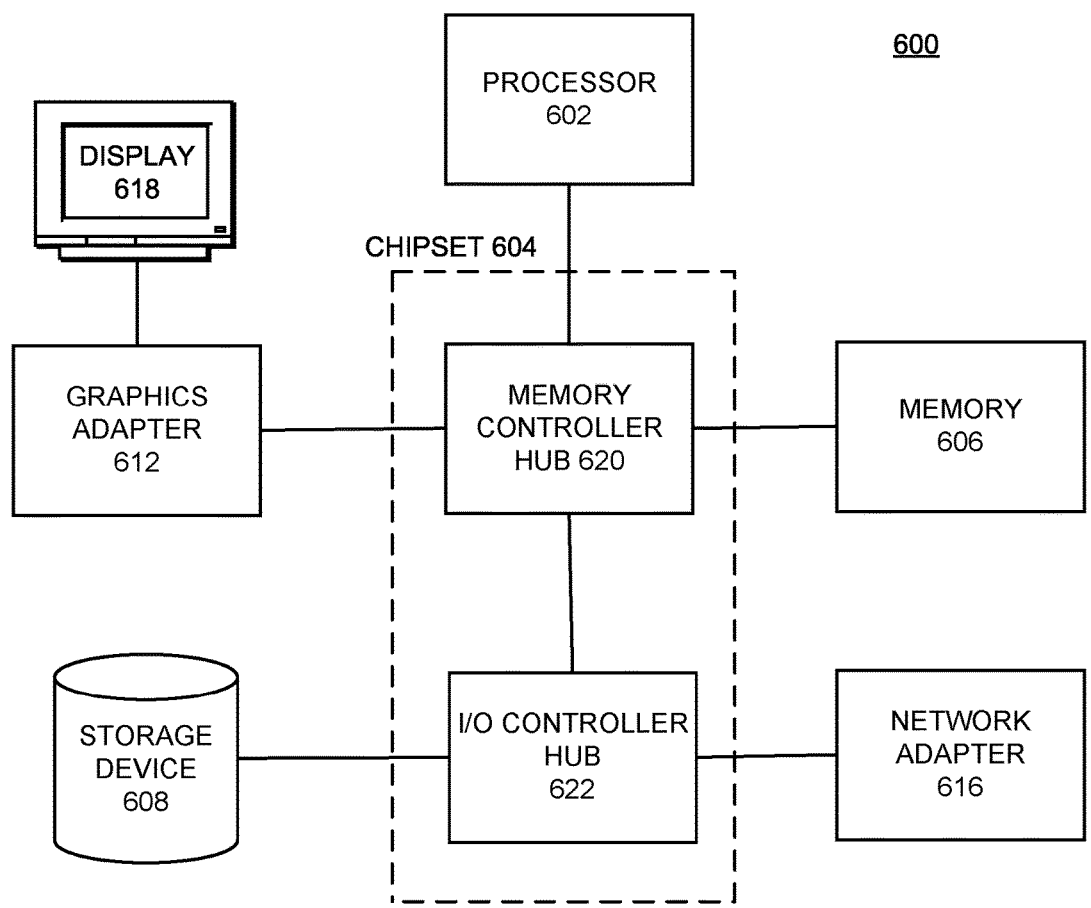
FIG. 6 is a high-level block diagram illustrating physical components of a computer used as part or all of the components from FIG. 1, according to one embodiment.

FIG. 6 is a high-level block diagram illustrating physical components of a computer 600 used as part or all of the components from FIG. 1A (e.g., the provisioning system 100 or tracking system 110), according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600, e.g., embodied within a storage area network (SAN).

As is known in the art, the computer 600 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 608, loaded into the memory 606, and executed by the processor 602.

Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for provisioning data center racks of devices, the method comprising:
   determining, by one or more processors, presence of a first device and a second device of a plurality of devices connected to a network, the plurality of devices further including one or more provisioned devices;
   receiving identification information for the first device and the second device;
   generating, by the one or more processors, a first thread and a second thread for validation of the first device and the second device, respectively, using at least the identification information;
   responsive to determining by the first thread that the first device is not validated, notifying a detection system that the validation of the first device has not passed; and
   responsive to determining by the second thread that the second device is validated, provisioning the second device for integration with the one or more provisioned devices.

2. The method of claim 1, wherein determining the presence of the second device is responsive to the second device triggering a Representational state transfer (REST) application programming interface (API) call.

3. The method of claim 1, wherein the identification information is received from the one or more provisioned devices, the identification information indicating at least a network address of the second device.

4. The method of claim 3, wherein determining by the second thread that the second device is validated comprises:
   determining that the network address of the second device is valid;
   receiving device information from the second device responsive to sending a request to the second device using the network address; and
   validating the device information.

5. The method of claim 4, wherein validating the device information comprises:
   determining that the second device is connected to valid neighbor devices of the plurality of devices; and
   correcting at least one port of the second device connected to one of the valid neighbor devices.

6. The method of claim 4, wherein validating the device information comprises:
   determining convergence of the second device on the network using Border Gateway Protocol (BGP).

7. The method of claim 4, wherein validating the device information comprises:
   determining that a power supply value of the second device is within a threshold value.

8. The method of claim 4, wherein provisioning the second device for integration with the one or more provisioned devices comprises:
   determining a configuration of the second device using the device information, the device information indicating at least a type and version of the second device; and
   storing the configuration of the second device.

9. The method of claim 1, further comprising:
   notifying the detection system that a data center rack including at least the second device has a production ready status; and
   triggering at least one workflow for the data center rack.

10. The method of claim 1, wherein the plurality of devices on the network are connected to each other in a hierarchy, the first device corresponding to a first level of the hierarchy, the second device corresponding to a second level of the hierarchy.

11. The method of claim 10, wherein determining by the second thread that the second device is validated comprises:
    determining a role and identity of the second device in the hierarchy, wherein provisioning the second device for integration with the one or more provisioned devices is based on the role and identity.

12. The method of claim 10, wherein the first device is a first switch for a set of devices at the first level of the hierarchy, the set of devices including at least a plurality of racks at the second level of the hierarchy, the second device being a second switch for one of the plurality of racks.

13. The method of claim 12, wherein the one of the plurality of racks includes at least a plurality of servers at a third level of the hierarchy, the method further comprising:
    determining presence of a third device of the plurality of devices, the third device being one of the plurality of servers.

14. A method for provisioning data center racks of devices, the method comprising:
    determining, by one or more processors, presence of a plurality of devices of a data center rack;
    determining, by the one or more processors, presence of one or more provisioned devices, the plurality of devices and the one or more provisioned devices connected to each other on a network;
    for each device of the plurality of devices:
       generating a thread for validation of the device using device information received from the device; and
       validating the device by the thread, at least one of the threads for the plurality of devices performing validation simultaneously and asynchronously with at least one other of the threads;
       responsive to the validation, provisioning, by the one or more processors, the device for integration with the one or more provisioned devices; and
    responsive to determining that each of the plurality of devices is provisioned, notifying a detection system that the data center rack is production ready.

15. A computer program product comprising a non-transitory computer readable storage medium having instructions encoded thereon that, when executed by one or more processors, cause the one or more processors to:
    determine presence of a first device and a second device of a plurality of devices connected to a network, the plurality of devices further including one or more provisioned devices;
    receive identification information for the first device and the second device;

generate a first thread and a second thread for validation of the first device and the second device, respectively, using at least the identification information;

responsive to determining by the first thread that the first device is not validated, notify a detection system that the validation of the first device has not passed; and responsive to determining by the second thread that the second device is validated, provision the second device for integration with the one or more provisioned devices.

16. The non-transitory computer readable storage medium of claim 15, wherein the identification information indicates at least a network address of the second device, and wherein instructions for determining by the second thread that the second device is validated further comprises instructions that when executed cause the one or more processors to:

determine that the network address of the second device is valid;

receive device information from the second device responsive to sending a request to the second device using the network address; and validate the device information.

17. The non-transitory computer readable storage medium of claim 16, wherein the instructions to validate the device information further comprises instructions that when executed cause the one or more processors to:

determine that the second device is connected to valid neighbor devices of the plurality of devices; and correct at least one port of the second device connected to one of the valid neighbor devices.

18. The non-transitory computer readable storage medium of claim 16, wherein instructions for validating the device information further comprises instructions that when executed cause the one or more processors to:

determine convergence of the second device on the network using Border Gateway Protocol (BGP); and determine that a power supply value of the second device is within a threshold value.

19. The non-transitory computer readable storage medium of claim 15, wherein the plurality of devices on the network are connected to each other in a hierarchy, the first device corresponding to a first level of the hierarchy, the second device corresponding to a second level of the hierarchy.

20. The non-transitory computer readable storage medium of claim 19, wherein instructions for determining by the second thread that the second device is validated further comprises instructions that when executed cause the one or more processors to:

determine a role and identity of the second device in the hierarchy, wherein provisioning the second device for integration with the one or more provisioned devices is based on the role and identity.

* * * * *